Figure 4:
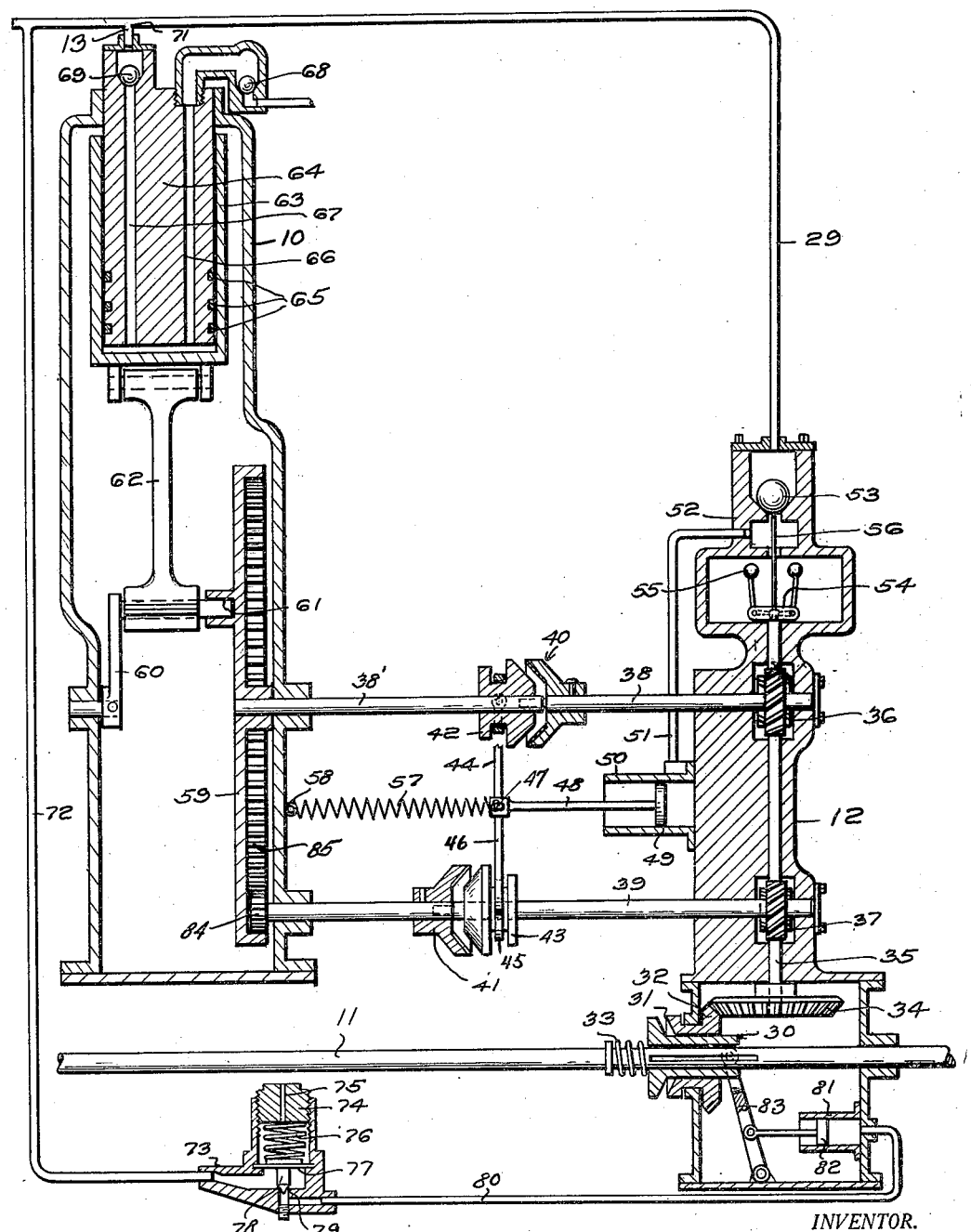

Feb. 2, 1932.   W. M. MOXLEY   1,843,399
AUTOMATIC CONTROLLING MEANS FOR AUTOMOBILES
Filed April 2, 1930   3 Sheets-Sheet 1
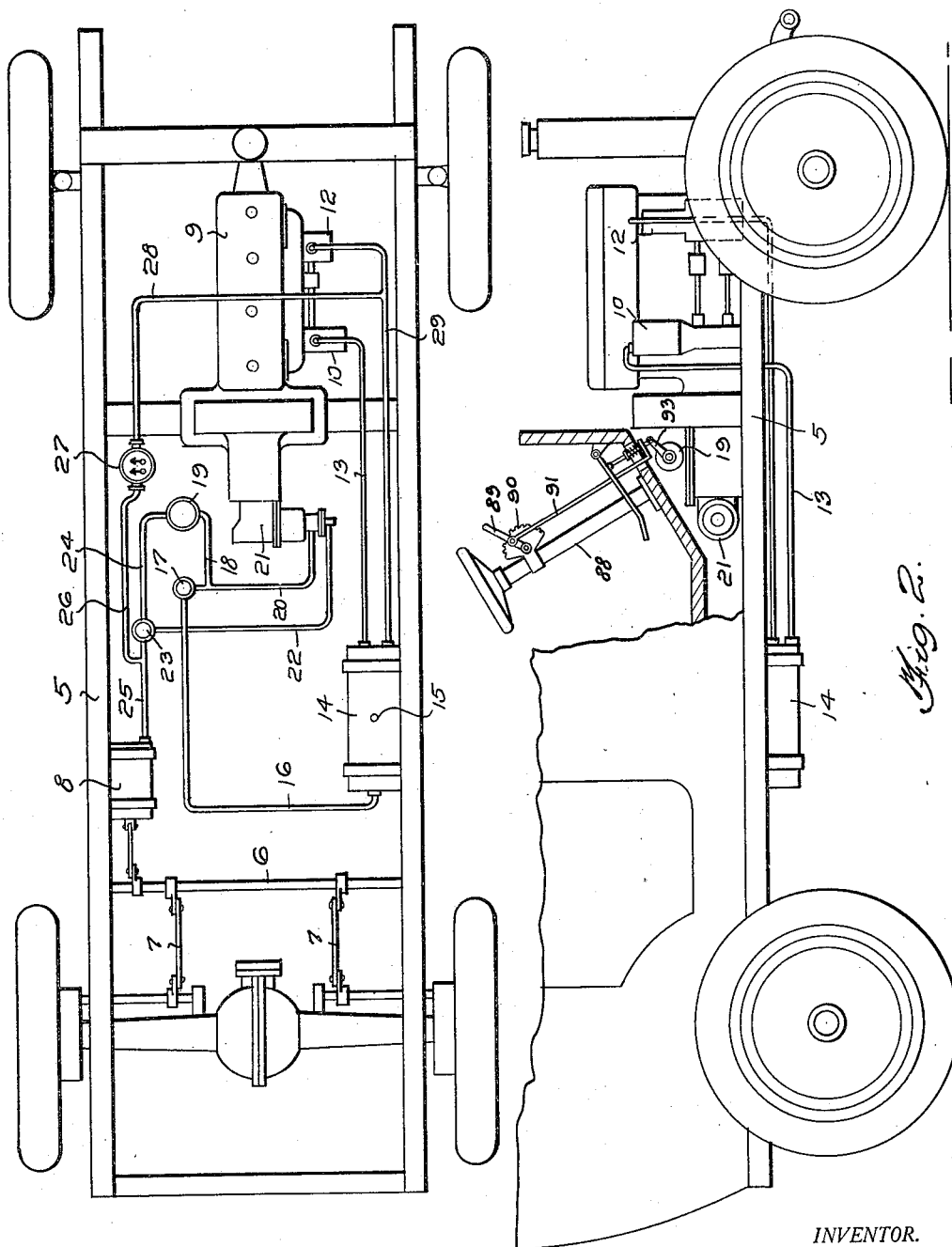
INVENTOR.
William M. Moxley,
BY
Stephen Campbell
ATTORNEYS

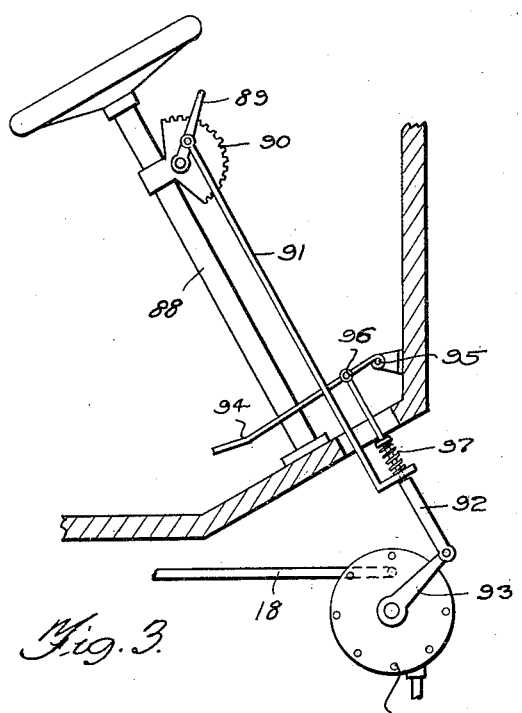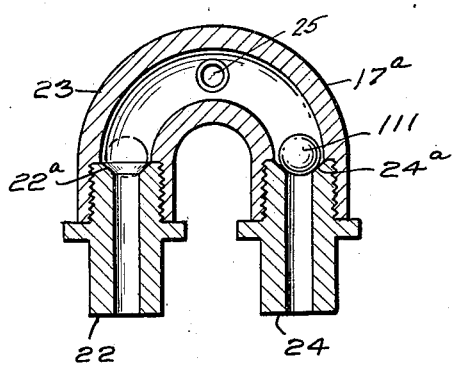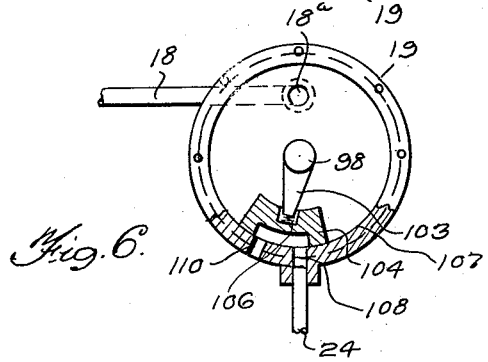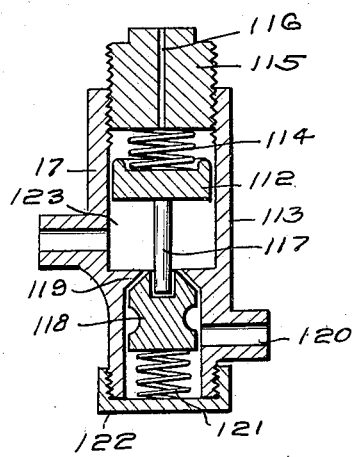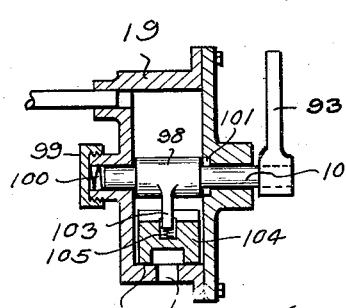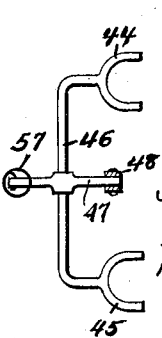

Patented Feb. 2, 1932

1,843,399

UNITED STATES PATENT OFFICE

WILLIAM M. MOXLEY, OF MARCELINE, MISSOURI

AUTOMATIC CONTROLLING MEANS FOR AUTOMOBILES

Application filed April 2, 1930. Serial No. 441,098.

This invention relates to an automatic controlling means for automobiles of the character of that illustrated in my prior Patent, No. 1,636,064. In that patent I have disclosed a structure adapted to automatically apply the brakes of an automobile, or other motor vehicle, when a predetermined speed of the vehicle has been attained, and to cut off the fuel supply upon a further increase of speed.

According to the present invention, I not only accomplish these same objects, but I provide means for manually applying the brakes, using the compressed air of my aforesaid mechanism as the motive power for the brake setting operation, and I further provide means for maintaining a supply of compressed air, under all conditions of speed of the vehicle. That is to say, I provide a compressor driven from a moving part of the engine, by high and low speed gearing, the arrangement being such that the gearing is automatically shifted to vary the speed of the compressor in such way as may be necessary, under varying rates of speed of the automobile engine.

Further objects and advantages of the invention will be set forth in the detailed description which follows.

In the accompanying drawings:

Figure 1 is a diagrammatic plan view of an automobile chassis, illustrating the location of the various valves and other elements which go to make up the apparatus of the invention, Fig. 2 is a diagrammatic side view, Fig. 3 is a side elevation of the mechanism associated with the steering column, and comprising a manually operating valve for controlling the air supply to the brake cylinders, Fig. 4 is an enlarged sectional view of the air compressor, and the gearing for driving the same, Fig. 5 is a detail sectional view of a double check valve, hereinafter described, Fig. 6 is a side elevation of the manually operated valve, with the face plate thereof removed, Fig. 7 is a cross sectional view through the manually operated valve, Fig. 8 is a sectional view through a reducing valve, hereinafter described, and Fig. 9 is a view of the clutch shifting mechanism hereinafter described.

Like numerals designate corresponding parts in all of the figures of the drawings.

Referring now to the diagrammatic Figures 1 and 2, 5 designates the automobile chassis, 6 the transverse rock shaft through which the brake rods 7 are actuated from the air brake cylinder 8. The engine of the motor vehicle is indicated at 9, and a vertically disposed compressor 10 arranged beside said engine, is driven through the gearing hereinafter described, in the gear case 12, from any suitable moving part of the engine, such as the cam or pump shaft 11. The air compressor delivers air through pipe line 13 to a main reservoir 14, having a relief or safety valve 15, thereon. A pipe line 16 conducts the air from the air reservoir to the casing of a reducing valve 17. From the casing of the reducing valve the air of reduced pressure is delivered either through a pipe line 18 to the casing of manually actuated valve 19, or through a branch 20 to the casing of the governor controlled valve 21, that is driven from the main drive shaft of the engine, and which forms the means in my Patent No. 1,636,064 of admitting air to the brake cylinder when the vehicle reaches a certain rate of speed and of cutting off the supply of fuel from the carburetor of the engine, when a higher rate of speed is reached. One air line 22 leads from the valve 21 to the casing 23 of a two-way valve, while another line 24 leads from the casing of the manually controlled valve to the casing of said two-way valve 23. Air line 25 leads from the casing of the two-way valve to the brake cylinder 8, while a branch line 26 leads from the branch line 25 to an air gauge 27 that is, preferably, located on the dashboard of the vehicle. An air line 28 leads from the gauge to and communicates with a line 29, which leads from the main reservoir to the casing which contains the operating gears of the compressor, for a purpose which will be hereinafter described.

Referring now to Fig. 4, it will be seen that the engine driven pump or magneto, or cam shaft 11, carries a clutch element 30, which, normally, is held in clutching engagement with the clutch element 31, of a bevel gear 32, by means of a spring 33. Gear 32 operates a gear 34 on a vertical shaft 35. Shaft 35 carries two worms 36 and 37, which drive the shafts 38 and 39, respectively. The shaft 38 has a high speed clutch 40 disposed in its length, while the low speed shaft 39 has a clutch 41 in its length, and these clutches comprise the slidable elements 42 and 43, that are operated by the yokes 44 and 45, of a transverse rock shaft 46. An outstanding crank arm 47 of the rock shaft 46 is connected to the piston rod 48, of a piston 49, in air cylinder 50. An air line 51 leads from this cylinder to a valve casing 52, to which valve casing the air line 29 is connected. Air line 29 has the full pressure of the main reservoir thereon, and, normally, this air pressure acts to seat a check valve 53. A centrifugal governor 54 is so arranged that when the weighted members 55 thereof fly outwardly under the influence of centrifugal force, the tails of the levers, by which said weighted members are carried, act to thrust a valve pin 56 upwardly to unseat the valve 53 and permit air to flow through pipe 48, to cylinder 50. This moves the piston 49 outwardly and rocks shaft 46 against the tension of a spring 57, one end of which is connected to a fixed part of the compressor casing, at 58, and the other end of which is connected to an extension of the crank 47. The yokes 44 and 45 are so disposed, with respect to the rock shaft 46, that when the piston 49 moves inwardly in the cylinder, under the influence of spring 57, the high speed clutch is thrown into action, while the low speed clutch is disengaged, and, thus, the shaft 38, through its subsection 38' will drive directly to the disc 59 from which the crank 60, of an air compressor, is actuated, the extremity of said crank entering an opening 61, formed in the disc 59.

The horizontal portion of the crank 60 engages a connecting rod 62 which reciprocates the cylinder 63. A stationary block 64 carrying the packing rings 65, has an inlet port 66, and an outlet port 67, formed therethrough. When the cylinder 63 is drawn downwardly by the connecting rod 62, air is drawn through the intake port 66 past an inlet valve 68, and when the cylinder moves upwardly, this air is expelled through port 67 past the discharge valve 69, into the main air line 29, at 71. A branch air line 72 leads from the air line 29 to the casing 73, of a governor valve, which comprises an adjusting nut 74, having a vent opening 75 formed therein, said adjusting nut serving to adjust the tension of a spring 76. This spring bears upon a valve carrying diaphragm 77, the valve 78 of which is adapted to close the port 79, under the action of the spring 76, except when the air pressure beneath the diaphragm 77 is sufficient to overcome spring 76. This action takes place when the main reservoir has been supplied with the maximum amount of air that it is desired to carry therein, and when this happens, the valve 78 opens and the air is permitted to pass through a branch 80 to a cylinder 81, where it acts upon a piston 82 and lever 83, to throw the clutch 30 out of action, and bring the gearing of Fig. 4 to a standstill. The arrangement is such that when the automobile is moving at a moderate rate of speed, the valve 53 will be closed; piston 49 will be retracted by spring 57, and the high speed clutch 40 will be in action, driving the air compressor at a desirable rate of speed. However, with the motor vehicle running at a high rate of speed, the shaft 11 would be moving so fast that the compressor would be actuated too rapidly, and when this occurs, the governor 55 acts to admit air past valve 53 to, through piston 49, throw the high speed clutch out of action and bring the low speed clutch into action. When this is done, the drive is from the worm shaft 35 and shaft 39 to a pinion 84, which meshes with an internal gear 85, formed upon the disc 59. Thus, the compressor will, at this time, be operating at a much lower rate of speed than the shaft 11, or at a rate of speed which will be practicable in conjunction with an air compressor.

Referring now to Fig. 3, 88 designates the steering column of the motor vehicle beneath which I locate an operating lever 89, which operates over a segment 90, and acts through a link 91 and stem 92 to move the crank arm 93 of the manually operating valve 19. The same effect may be secured by downward pressure upon a foot pedal 94, which is pivoted at 95, and is, likewise, pivotally connected at 96 to the upper end of the stem 92. The connection of the lower end of the rod 91, with the stem 92, is a yieldable one in one direction, due to the presence of a spring 97. This spring permits the downward movement of the stem 92 to actuate the crank arm 93, without disturbing the handle 89. When the crank arm 93 is moved downwardly to apply the brake, turning movement is imparted to the valve actuating rock arm 98, (see Figs. 6 and 7) and cap 99 presses against the spring 100, and this spring, in turn, acts against the rock arm 98 and presses the same against a leather washer 101, to prevent air leaking past the rocker stem 102. The rock arm 98 carries a crank arm 103, which, in turn, engages a slide valve 104. The arm 103 merely enters a recess 105 in the slide valve, and a spring 106 is disposed between the end of said arm and the slide valve, so that the slide valve is pressed against the arcuate valve seat 107. This slide valve controls a port 108, which is in communication with the brake cylinder, through the branch 24. The supply from the main reservoir and through the reducing valve, enters the casing of the manually operable valve, at 18ª, which is the terminal of branch pipe 18. An exhaust port 110 is formed through the valve seat and casing of the manually operable valve, and when the slide valve is in the position illustrated in Fig. 6, the brake cylinder is vented to the atmosphere, while, when the slide valve is moved to the left, in Fig. 1, to cover port 108, while leaving port 110 covered, air may flow from 18ª to 108 and thence through branch 24 and two-way valve 23, to the brake cylinder 8, to set the brake. In like manner, this same setting of the brake may be accomplished automatically in the manner described in my aforesaid patent, whenever valve 21, through its governor actuated mechanism, admits air to branch 22. The air gauge 27 is provided with two separate hands, one to indicate the pressure in the brake cylinder, and the other to indicate the pressure in the main reservoir, and the two branches 26 and 28, leading to said gauge, have no connection with each other, at said gauge.

Referring now to Fig. 5, it will be seen that the brake cylinder supply line 25 leads into the casing of inverted U-shape 17ª, while pipes 22 and 24, from the manually operated valve 19, and the valve 21, respectively, lead to the terminal ends of said U-shape casing. Valve seats 22ª and 24ª cooperate with a ball check valve 111. Thus, when the air supply to set the brake is through the branch 24 from the manually operated valve, ball check valve 111 is forced over and seats on the seat 22ª, and the air from 24 can pass out of port and pipe 25 to the brake cylinder 8, while, when the air supply is from the valve 21, through branch 22, the ball check valve 111 is forced over to the position illustrated in Fig. 5, and the air is prevented from entering 24, but is permitted to pass out of 25 to the brake cylinder. The reducing valve may be of any conventonal form, however, in the particular embodiment that I have chosen for purposes of illustration, a piston 112 operates in a cylinder 113, and spring 114, the tension of which may be adjusted by a nut 115, that is provided with a vent 116, bears upon said piston. The downward movement of the piston acts through a stem 117 to move a valve 118 from its seat 119. The supply from the main reservoir enters from 120, and a spring 121 bears between a cap 122 and the valve 118. When the air pressure in the compartment 123 equals that for which the adjusting nut 115 has been set, the pressure will act to move the piston upwardly and permit the pressure under valve 118, in conjunction with the upward thrust of spring 121, to seat said valve 118, thus, the pressure in the line will be automatically maintained at whatever point the nut 115 may be set.

From the foregoing description, it will be seen that I have provided, in a unitary construction, means by which a motor vehicle may be controlled, both manually and automatically, so that its rate of speed may not exceed a predetermined degree, together with means for automatically maintaining a proper supply of air for the operation of the several instrumentalities, throughout all rates of speed of the vehicle.

The operation of the several instrumentalities employed has been set forth in the detailed, preceding description. In recapitulation it may be stated that the brakes may be set manually through either hand or foot manipulation of valve 19, or they may be set automatically by the operation of the governor controlled valve 21 (Fig. 1) which, as before stated, corresponds to the valve constituting the subject matter of my Patent #1,636,064. Air is led through 16, 17 and 20 to said valve 21 and, when the engine reaches a predetermined rate of speed this air is delivered through pipe 22 to two-way valve 23 and thence through 25 to the brake cylinder. The construction the two-way valve is such, as previously described, as to prevent the air from passing into pipe 24 at this time. Upon the other hand, if the brakes are to be set manually and valve 19 be either hand or foot operated to connect pipes 24 and 18, then air will flow from reducing valve 17 through 18, 19, 24, 23 and 25 to the brake cylinder, passage of the air into 22 being, at this time, prevented by the action of the two-way valve.

It is to be understood that the invention is not limited to the precise construction set forth, but that it includes within its purview whatever changes fairly come within either the terms of the spirit of the appended claims.

Having described my invention, what I claim is:

1. The combination with a motor vehicle and its brakes, of air cylinders constituting the power means for setting said brakes, means for controlling the air supply to said cylinders in such manner that the brakes are set by said cylinders when the vehicle reaches a predetermined degree of speed, manually operable controlling means for said air cylinder through the medium of which said brakes may be set manually, said manual controlling means comprising both hand and foot operated members.

2. A device of the character described, comprising in combination a brake cylinder, a main reservoir, a two-way valve, a manually operable controlling valve, an automatically operable controlling valve, a connection between the air reservoir and the automatically operable controlling valve, and between the main reservoir and the manually operable controlling valve, a connection between the automatically operable valve and the two-way valve, a connection between the manually operable valve and the two-way valve, and a connection between the two-way valve and the brake cylinder, said two-way valve being so constructed that the air pressure acts to close communication through said valve to the manually operable valve when air is entering said two-way valve from the automatically operating valve and to shut off the passage of air from the two-way valve to the automatically operable controlling valve when air is entering the two-way valve from the manually operating valve.

3. The combination with a motor vehicle and its brakes, of air cylinders constituting the power means for setting said brakes, means for controlling the air supply to said cylinders in such manner that the brakes are set by said cylinders, when the vehicle reaches a predetermined degree of speed, manually operable controlling means for said air cylinders through the medium of which said brakes may be set manually, said manually operable controlling means comprising an oscillatory valve, a crank for moving the same, a stem connected to said crank, a foot pedal connected to said stem, a hand operated member and means for connecting said member to said stem in such manner that the stem moves with the member in one direction of movement of the latter, said member being movable independently of the stem in its other direction of movement.

4. In a motor vehicle, the combination with a brake cylinder, an air reservoir, a manually operable valve for controlling the flow of air from the reservoir to the brake cylinder, an engine driven automatically controlled valve for controlling the flow of air from the reservoir to the brake cylinder, and a reducing valve common to both the automatically controlled valve and the manually operable valve.

In testimony whereof I affix my signature.

WILLIAM M. MOXLEY.